United States Patent [19]

Diehl et al.

[11] Patent Number: 5,111,872

[45] Date of Patent: May 12, 1992

[54] TRANSMISSION CASING COVER WITH TUBULAR MECHANICALLY CRIMPED CONDUIT CAST IN SITU

[75] Inventors: Rodney A. Diehl, Mt. Pleasant; Robert L. Uhrman, Jr., Brentwood, both of Tenn.; Robert G. Bishop, Troy, Mich.; Donald B. Campbell, Franklin, Tenn.

[73] Assignee: Saturn Corporation, Troy, Mich.

[21] Appl. No.: 728,312

[22] Filed: Jul. 8, 1991

Related U.S. Application Data

[60] Continuation of Ser. No. 546,989, Jul. 2, 1990, abandoned, which is a division of Ser. No. 481,533, Feb. 20, 1990, Pat. No. 4,958,537.

[51] Int. Cl.$^5$ .............................................. B22D 19/00
[52] U.S. Cl. ............................................... 164/98; 164/108; 164/112
[58] Field of Search ................. 164/98, 108, 110, 112, 164/76.1

[56] References Cited

U.S. PATENT DOCUMENTS

| | | | |
|---|---|---|---|
| 3,064,112 | 11/1962 | Hanzel | 164/98 |
| 4,738,159 | 4/1988 | Kato | 74/606 R |
| 4,829,642 | 5/1989 | Thomas | 164/98 |
| 4,832,106 | 5/1989 | Bücking | 164/98 |

FOREIGN PATENT DOCUMENTS

| | | | |
|---|---|---|---|
| 2379340 | 10/1978 | France | 164/98 |
| 55-73455 | 6/1980 | Japan | 164/98 |
| 55-78813 | 6/1980 | Japan | 164/98 |
| 59-144553 | 8/1984 | Japan | 164/98 |
| 61-150766 | 1/1986 | Japan | 164/98 |
| 640440 | 1/1984 | Switzerland | 164/98 |

Primary Examiner—Richard K. Seidel
Assistant Examiner—Rex E. Pelto
Attorney, Agent, or Firm—Donald F. Scherer

[57] ABSTRACT

A novel cover (10) for one end of the casing within which a vehicular transmission is housed and a unique method for making the cover. The cover (10) has a metallic body portion (12) within which a unitary manifold (40) has been cast in situ. The manifold (40) incorporates a plurality of conduits having artight mechanically crimped ends (A-E) which have been preformed and conjoined into the unitary manifold (40) that is precisely disposed within a mold. Molten metal is admitted into the mold to encapsulate the manifold (40) within the metallic body portion (12) of the cover (10). After the cover (10) has been cast, with the manifold (40) encapsulated therein, the cover (10) is removed from the mold, and only a relatively modest amount of machining operations are required to complete the cover (10).

2 Claims, 3 Drawing Sheets

| Forming a plurality of individual conduits in conformity with a predetermined plurality of configurations |

↓

| Conjoining the individual conduits into a unitary manifold |

↓

| Positioning the manifold within a mold cavity to form a cover |

↓

| Admitting molten metal into the mold to cast the manifold _in situ_ within the metal |

TRANSMISSION CASING COVER WITH TUBULAR MECHANICALLY CRIMPED CONDUIT CAST IN SITU

This is a continuation of application Ser. No. 07/546,989. field on Jul. 2, 1990 now abandoned, which is a division of U.S. Ser. No. 07/481,533, filed Feb. 20, 1990, now U.S. Pat. No. 4,958,537 issued Sep. 25, 1990.

TECHNICAL FIELD

The present invention relates generally to automatic transmissions for vehicles. More particularly, the present invention relates to the cover for at least one end of the casing in which the automatic transmission is housed. Specifically, the present invention relates not only to the configuration of the cover itself, but also to a unique method for making the novel cover. Such a cover is characterized by a manifold which incorporates a plurality of conduits; the manifold being encapsulated within the cover to communicate with, and the a functional part of, the hydraulic system utilized by the transmission mechanism.

BACKGROUND OF THE INVENTION

The advent of down-sized automobiles has also encouraged the production of smaller, more compact engines and transmissions for such vehicles. In this regard efforts have been made to decrease the size of transmissions even further. Because the torque transferring devices—i.e., the brakes and clutches—within the mechanism of a vehicular transmission are typically operated by hydraulic pressure, one effort to reduce the size of the transmission has resulted in the utilization of bores through the various shafts within the transmission, the bores serving as passageways in the hydraulic system by which pressurized fluid is directed to, and exhausted from, the torque transfer devices. Concomitant efforts have also been directed to the provision of passageways within the casing that houses the transmission mechanisms—such passageways in the casing also being incorporated to convey pressurized fluid utilized by the hydraulic system of the transmission. In the continuing effort to decrease the size of the transmission, the cover for at least one end of the casing in which the transmission is housed has also been designed in various configurations to provide passageways therein which are included within the hydraulic system serving the transmission.

One particular prior art technique involves casting a transmission cover so that the end wall thereof is relatively thick. The relatively thick wall is then machined to incise a plurality of recessed pathways across the outer surface of the end wall. The end wall is then appropriately drilled to effect communication between the pathways and the remainder of the hydraulic system. A closure plate is secured over the recessed pathways to close each pathway from adjacent pathways as well as from atmosphere. This prior art technique has been widely adopted, but it does have some drawbacks which include: (a) an increased cost for the material used to form the thicker-than-normal end wall in the cover; (b) an increased cost for machining the recessed pathways and for precisely, and accurately, drilling connecting bores from the pathways through the end wall to communicate with appropriate portions of the hydraulic system interiorly of, or within, the casing; (c) the need to provide a closure plate to cover the recessed pathways; and, (d) the need to employ seals between adjacent pathways, as well as between the pathways and atmosphere, to reduce not only the undesirable cross-communication between adjacent pathways but also the undesirable loss of hydraulic fluid to atmosphere.

Closed passageways have also been provided in covers for transmission casings by the use of an expendable core when casting the cover. This approach, however, has also proven to be disadvantageous, particularly in view of the increased unit cost resulting from the additional steps required to make, and remove, the expendable core.

SUMMARY OF THE INVENTION

It is, therefore, a primary object of the present invention to provide an improved cover for at least one end of a transmission casing, the cover incorporating conduits therethrough which possess leak-proof integrity, even when connected to a source of hydraulic fluid under relatively high pressure.

It is another object of the present invention to provide a cover, as above, for a transmission casing, the configuration of the cover obviating the need to provide separate means for sealing the conduits therethrough from each other, or from atmosphere.

It is a further object of the present invention to provide a method by which to make an improved cover, as above, for a transmission casing, the improved cover requiring fewer machining operations and being, therefore, less labor intensive and less costly to manufacture.

These and other objects of the invention, as well as the advantages thereof over existing and prior art forms, which will be apparent in view of the following detailed specification, are accomplished by means hereinafter described and claimed.

In general, the present invention is directed to the configuration of, and a method by which to make, a cover for at least one end of a transmission casing. The cover may incorporate a plurality of metallic conduits. Specifically, the conduits, which are preferably tubular, are shaped to a predetermined configuration and thereafter cast in situ within the body portion of the cover so that the ends of each conduit may communicate directly with the hydraulic system serving the transmission mechanism, irrespective of whether the hydraulic system utilizes: discrete conduits interiorly of the casing; bores through the shafts of the transmission mechanism; or, passageways formed within the transmission casing.

As will be hereinafter more fully explained, a method embodying the concepts of the present invention to fabricate a cover for a transmission casing utilizes several distinctly unique steps. In that regard, a plurality of individual conduits are formed into predetermined configurations so that each conduit will be capable of communication with desired portions of the hydraulic system utilized by the transmission mechanism that is housed within the casing with which the cover is employed. A selected plurality of conduits, each having its own predetermined configuration, are conjoined into a unitary manifold. The manifold is accurately positioned within a mold, and molten metal is admitted into the mold to cast the manifold in situ within the body portion of the resulting cover.

The method of the present invention is described in conjunction with one exemplary embodiment of a cover for a transmission casing, and that disclosure is deemed sufficient to effect a full understanding of the present invention. It should be appreciated, however, that the disclosure of an exemplary cover is not an attempt to show all of the various forms and modifications in which the invention might be embodied; the invention is t be measured by the appended claims and not by the details of the specification.

DESCRIPTION OF AN EXEMPLARY EMBODIMENT

Figure 1:
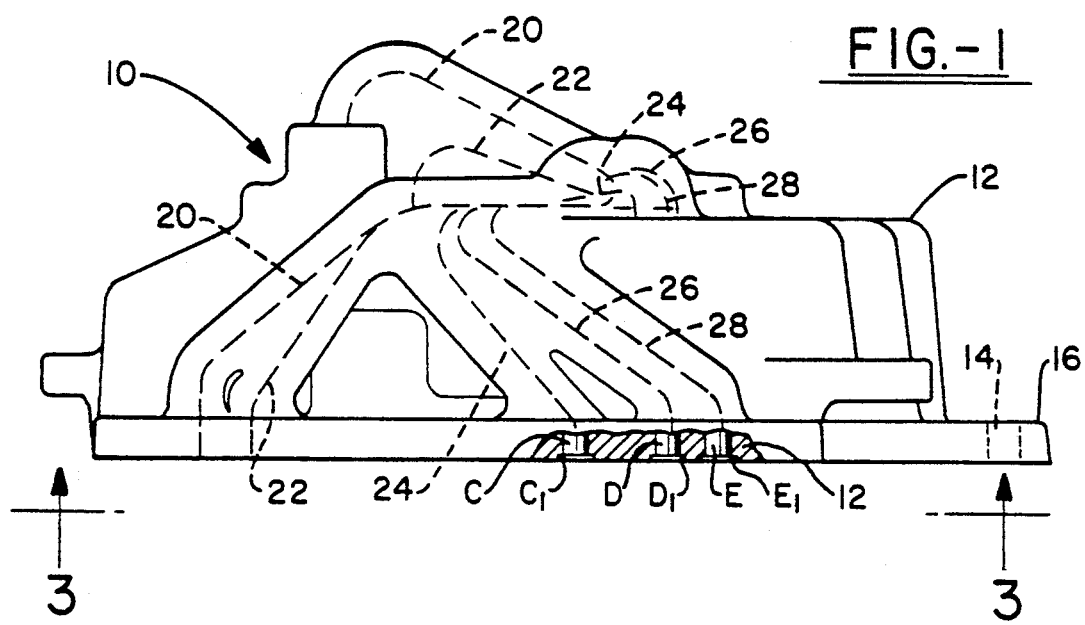
FIG. 1 is an elevational view of a cover for a transmission casing with the passages provided by the conduits, each following its own pathway through the cover, being schematically indicated generally in chain line, the cover having been made in accordance with the method of the present invention.
Figure 2:
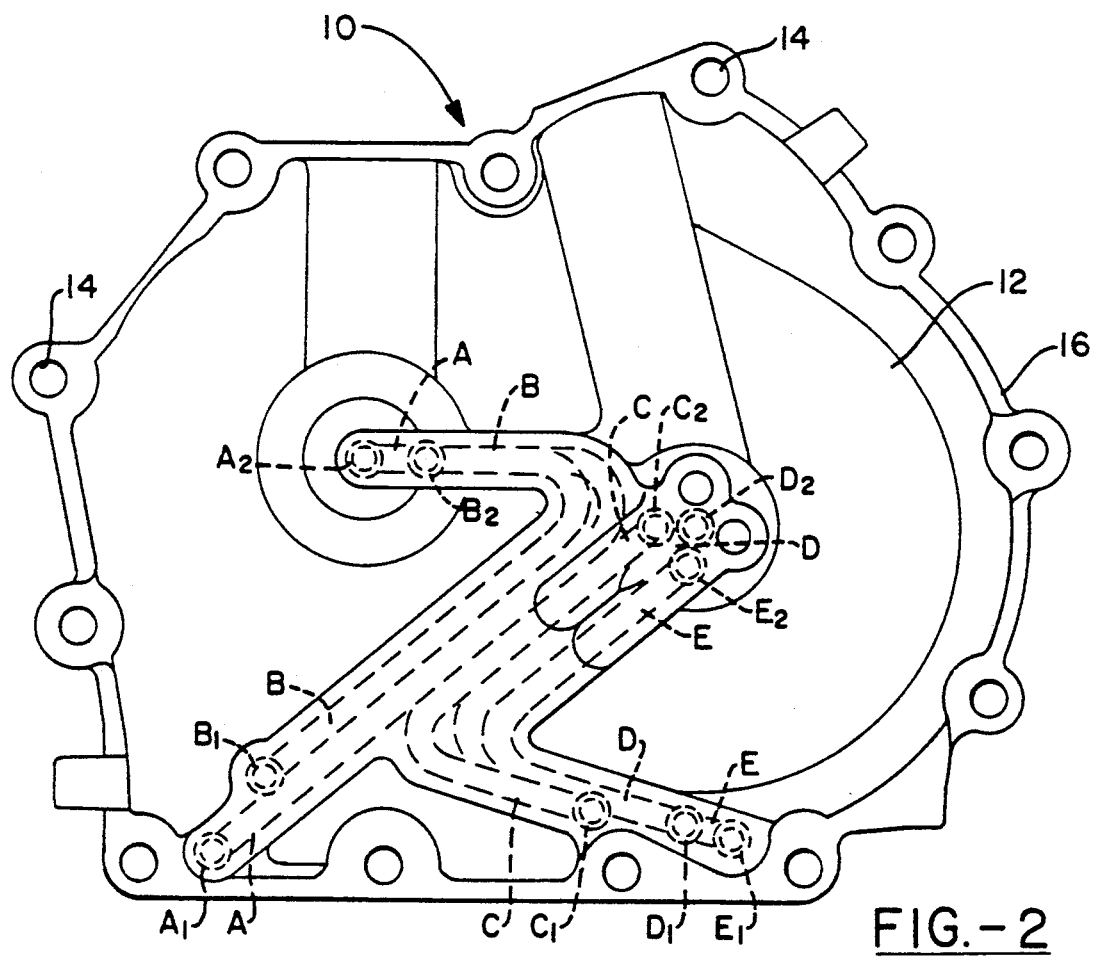
FIG. 2 is a top view of the cover depicted in FIG. 1.
Figure 3:
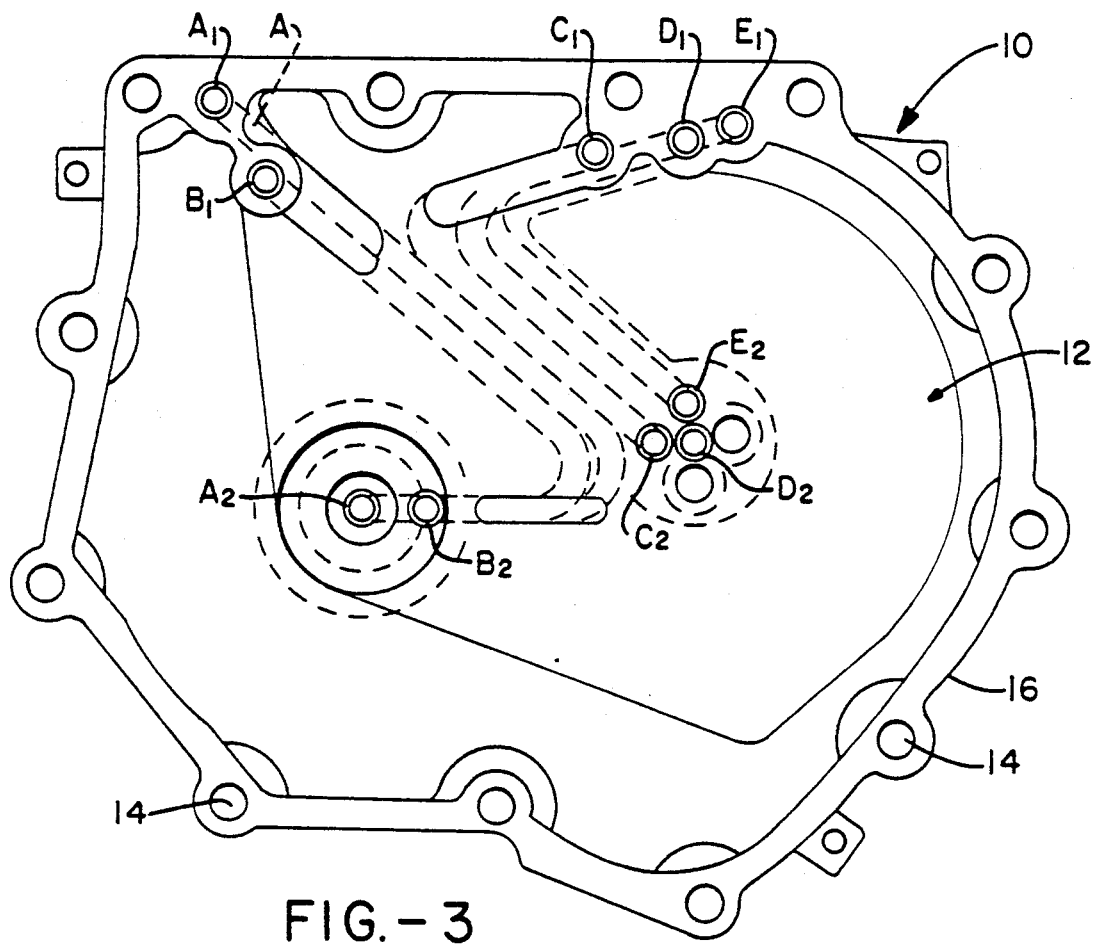
FIG. 3 is a bottom view taken substantially along line 3—3 of FIG. 1 to depict the interior surface of the cover.

One representative form of cover, the configuration of which embodies, and which is made in accordance with a method embodying, the concepts of the present invention is designated generally by the numeral 10 on the accompanying drawings and may be employed as the cap for one end of a casing within which a transmission mechanism is housed. FIGS. 1-3 illustrate elevational, top, and bottom views, respectively, of the cover 10. The body portion 12 of the cover 10 may be die-cast to make provision for a plurality of mounting bores 14 located at spaced intervals along the peripheral edge 16 of the body portion 12. The cover 10 may be bolted to the casing of a vehicular transmission (not shown) through the mounting bores 14.

It should be understood that the cover 10 may be made in a variety of configurations other than the one illustrated in the drawings The specific configuration, of course, will depend primarily upon the number and orientation of conduits which may be required to pass through the cover 10. The number, and orientation, of conduits passing through the cover will depend upon the number and positions of the passageways within the transmission casing to which the cover 10 is bolted as well as the number and position of independent passages interiorly of the transmission casing and the number and location of bores through the shafts within the transmission mechanism itself. In any event, the particular cover 10 depicted in the drawings is designed to pass hydraulic fluid pressure through five conduits incorporated within the body portion 12 of the cover 10, and these conduits communicate with five inlet ports and five outlet ports. The pathways of the five passages defined by the five conduits incorporated within the body portion 12 of the cover 10 may, of necessity, be somewhat contorted, and the passageways provided by the representative five conduits which extend through the body portion 12 of the cover 10 depicted are schematically traced by the chain lines in FIG. 1, and they are designated generally by the numerals 20, 22, 24, 26 and 28, respectively.

More particularly, and with specific reference to FIGS. 2 and 3, the five conduits which provide the passageways 20, 22, 24, 26 and 28, respectively, are identified by the letters A, B, C, D, and E, and the ports through which each conduit opens are designated by the subscript numerals "1" and "2" applied to the letter designation for the conduit which terminates at the ports so designated. For example, one end of the conduit A communicates through port $A_1$, and the other end of conduit A communicates through port $A_2$. In the same manner, one end of each of the conduits B through E communicates through ports $B_1$, $C_1$, $D_1$ and $E_1$, and the opposite end of each of those conduits communicates through ports $B_2$, $C_2$, $D_2$ and $E_2$. It should be understood that whether a port is an inlet port or an outlet port is not important to the present invention. It is only necessary to understand that each conduit A through E has opposite ends which terminate at ports through which the respective passageways 20, 22, 24, 26 and 28 communicate. The ports are designated by the subscript numerals "1" and "2" applied to the letter designation of the conduit which communicates through that port.

Figure 4:
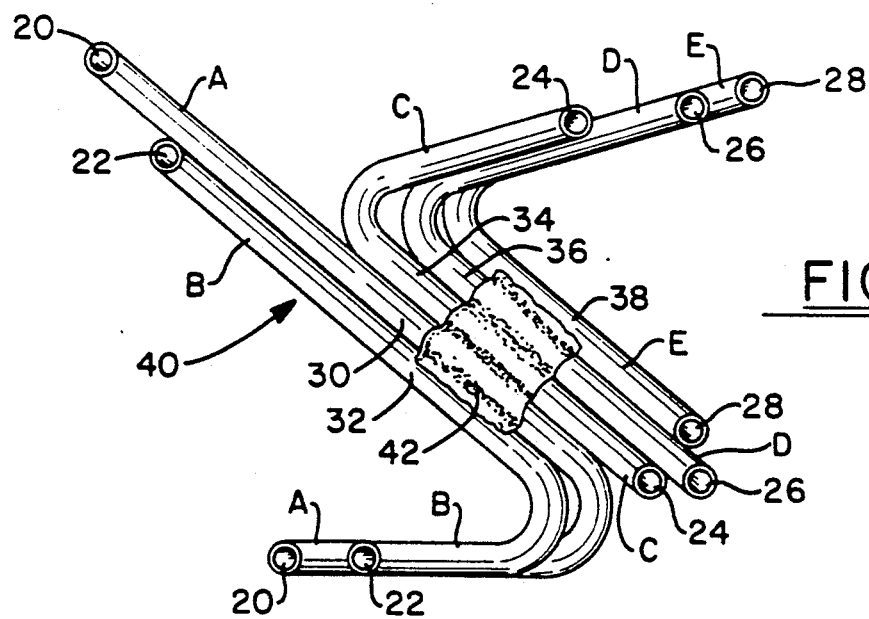
FIG. 4 is a bottom view of a plurality of individual conduits which have been shaped to a predetermined configuration and conjoined as a manifold in that predetermined disposition in which they are oriented in the exemplary cover depicted in FIGS. 1-3.

Referring to FIG. 4 of the drawings, the conduits A through E may be individual, metallic tubes which are cast in situ within the metallic body portion 12 of the cover 10. While the exact pathway followed by each tubular conduit within the body portion 12 of the cover 10 may be arbitrary, the location of the ports through which the two opposite ends of each conduit communicate are fixed. The ports will, for example, be required to align with: selected independent conduits interiorly of the casing; selected passageways within the transmission housing; or, selected bores axially within the shafts of the transmission mechanism.

The tubular conduits A through E illustrated in FIG. 4 have each been formed, or bent, to a predetermined configuration. In so forming each conduit it is provided with at least one limited linear span 30, 32, 34, 36 and 38, respectively, and the axes of the five linear spans are parallel so that the adjacent conduits may be easily conjoined to form a single, unitary manifold indicated generally by the reference numeral 40. The adjacent conduits may be conjoined by various means including welding, brazing or the like, and the joinder of the separate conduits into the unitary manifold 40 is indicated in FIG. 4, as at 42.

Figures 5, 6:
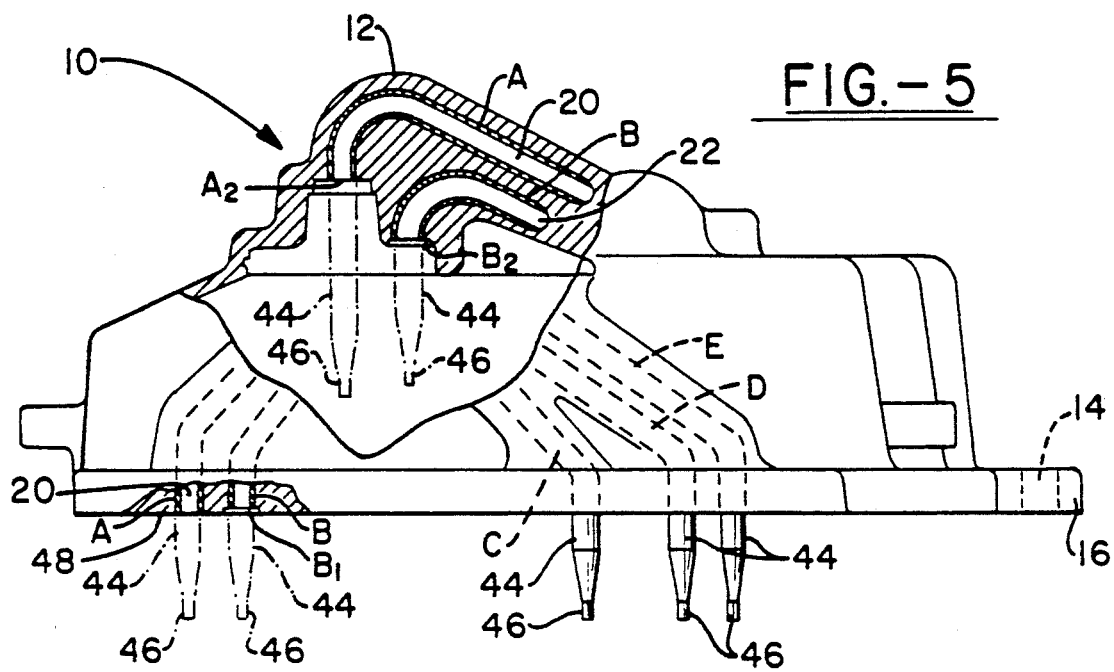
FIG. 5 is an elevational view, similar FIG. 1 to and partially broken away, to show the manifold cast in situ and as it appears prior to the final machining of the cover.
FIG. 6 is a flow chart designating the fundamental steps of a method embodying the steps of the present invention to make a cover as shown in FIGS. 1-3 and 5 for at least one end of a transmission casing.

Conjoining the five, individual metal conduits A through E into a single, unitary manifold 40 greatly facilitates mounting of the conduits within the mold prior to casting the body portion 12 of the cover 10. Referring to FIG. 5 of the drawings, the manifold 40 is represented in the disposition in which it is positioned in the mold, and thus within the body portion 12, as cast. As clearly illustrated, the opposite ends of each conduit A through E terminates in a selvage portion 44 which extends beyond the envelope that delineates the confines of the body portion 12. Further, each selvage portion 44 is preferably crimped closed, as at 46. This is done to preclude the metal used in the casting operation from intruding within the passageways 20, 22, 24, 26 and 28 which extend through individual conduits A through E, respectively, and also to maintain an internal pressure within each conduit so that the conduit does not collapse during the casting operation. Upon completion of the casting operation, the selvage portions 44 extending outwardly of the envelope formed by the body portion 12 are cut off at the interior surface 48 on the body portion 12 of the cover 10. As represented in FIG. 5, the selvage portion 44 at the opposite ends of conduit A are removed—the portion having been removed being depicted in chain line. The removal of the selvage portions 44 opens each conduit to permit unobstructed access to the interior passageway therethrough. The removal of the selvage 44 from each end of conduit A thus accesses passageway 20. With the conduits opened, an end cutting tool may be employed to complete the conduit-to-body portion interface at the interior surface 48 to form the ports designated by the subscripts "1" and "2" in the drawings. With continued reference to FIG. 5, the end cutting tool will have been applied to form the ports $B_1$ and $B_2$ through which the passageway 22 within conduit B communicates.

It should be recognized that some additional finishing steps may be employed, depending upon the specific transmission casing to which the cover is to be attached.

It should be pointed out that the body portion 12 of the cover 10 may be cast from aluminum, and the tubes A through E may be steel. It has been found that steel tubes with crimped, or swedged, ends are particularly successful not only to preclude the conduit from collapsing but also to preclude metal from intruding into the hollow interior of the conduit during the casting operation. Although aluminum conduits will work, an aluminum conduit requires greater wall thickness than comparable steel conduits in order to provide the strength necessary to withstand the pressures that may be applied by the molten metal during admission thereof into the mold. It must be appreciated that the increased wall thickness required for aluminum tubing may prevent the use of aluminum tubing in the limited space available in the environment of a vehicle transmission.

To summarize the steps employed to fabricate the cover 10, a plurality of tubular conduits A through E are cut to length. The cut conduits A through E are formed, or bent, in a fixture so that each conduit satisfies the predetermined configuration for that conduit. Either before or after the conduits are bent, the two ends of each conduit are closed. Typically, the ends are spun, or swedged, to provide an air-tight closure 46 at the end of each selvage portion 44 located at the opposite ends of each conduit. A selected plurality of conduits A through E, each having been bent to its uniquely predetermined configuration, are properly disposed and conjoined into a unitary manifold 40. To facilitate assembly of the manifold, each conduit may preferably be supplied with a linear portion. The linear portion of successive conduits may be disposed in contiguous juxtaposition and then conjoined. Typically, the conduits A through E are conjoined by being brazed or welded together, as appropriate for the particular material from which the conduits are made.

An appropriate mold, or die, is provided within which the body portion 12 of the cover 10 can be cast. The interior surface of the mold is preferably coated with a releasing agent, and the manifold 40 is positioned within that mold. The selvage portions 44 of the several conduits A through E forming the manifold 40 are insertably received within a plurality of holes provided in, or through, the mold, and several gage points, or benchmarks, may be employed to assure that the manifold 40 is properly, and accurately, oriented within the mold. The mold is then closed and locked.

Molten metal is admitted into the closed mold to form the body portion 12 of the cover 10 and to encapsulate the manifold in situ within the body portion 12. A die-casting technique is preferably employed to cast the body portion 12 of the cover 10 with the manifold 40 encapsulated therein. After the metal within the mold changes from its fluid to its solid state, the mold is opened to remove the casting. The runner system, the flash and any other excess metal is then removed to leave only the body portion 12 of the cover 10 with the manifold 40 encapsulated therein.

The selvage portion 44 is then removed from the terminal end portion of each conduit, and the ports are formed by using an end cutting tool to recess the end of each conduit A through E below the level of the interior surface 48 of the cover 10. Thereafter, any remaining machine operations, such as finishing the mounting bores and performing any other desired, or required, non-conduit related steps, may be performed to complete the cover.

While certain specific details of a particular embodiment have been shown for the purpose of illustrating the invention, it should be apparent to those skilled in the art that various changes and modifications may be made therein without departing from the spirit or scope of the invention. As such, the present invention not only teaches a method for making a cover for the end of a transmission casing whereby the passages provided by the conduits encapsulated within the body portion of the cover are imbued with integrity from the other and from atmosphere but also that the other objects of the invention can likewise be accomplished.

The embodiments of the invention in which an exclusive property or privilege is claimed are defined as follows:

1. A method of making a coer for one end of the casing in which a vehicular transmission is housed, said method comprising the steps of: forming a plurality of individual conduits in conformity with a predetermined plurality of configurations; conjoining a selected plurality of the formed conduits into a unitary manifold; positioning the manifold in a mold; closing the terminal portions of each conduit by mechanical metal deformation to form an air tight selvage end at each terminal portion prior to admitting the molten metal into the mold; admitting molten metal into the mold to encapsulate the manifold in situ within the metal; and, removing the closed selvage ends of each conduit after the manifold has been encapsulated within the metal.

2. A method of making a cover for one end of an automatic transmission casing comprising the steps of: forming a plurality of individual metallic tubes into a plurality of conduits each of which will interconnect with the hydraulic system of an automatic transmission system; providing each conduit with at least one linear portion; combining the plurality of formed conduits into a unitary manifold by fastening the conduits together along the linear portions; closing the terminal ends of all of the conduits by mechanically crimping to form airtight ends; mounting the unitary manifold in a mold having a cavity to form the body portion of the cover; casting the body portion of the cover to encapsulate the unitary manifold in situ within the body portion of the cover; removing the selvage portion of each conduit; and, machining ports in the body portion of the cover through which the conduits open.

* * * * *